United States Patent [19]

Ito et al.

[11] 4,360,081
[45] Nov. 23, 1982

[54] DISC BRAKE

[75] Inventors: Hiroshi Ito, Kawasaki; Koichi Tamura, Tokyo, both of Japan

[73] Assignee: Tokico Ltd., Kawasaki, Japan

[21] Appl. No.: 170,875

[22] Filed: Jul. 21, 1980

[30] Foreign Application Priority Data

Jul. 20, 1979 [JP] Japan .................................. 54/93117

[51] Int. Cl.³ ........................................... F16D 65/02
[52] U.S. Cl. ............................................... 188/73.38
[58] Field of Search ......................... 188/73.35-73.38

[56] References Cited

U.S. PATENT DOCUMENTS 4,222,465 9/1980 Haraikawa et al. ......... 188/73.38

FOREIGN PATENT DOCUMENTS 2225178 1/1974 Fed. Rep. of Germany ... 188/73.38
1967110 10/1977 Fed. Rep. of Germany ... 188/73.38
1381589 1/1975 United Kingdom ............ 188/73.38

Primary Examiner—Duane A. Reger
Attorney, Agent, or Firm—Wenderoth, Lind & Ponack

[57] ABSTRACT

A disc brake including a pair of friction pads disposed on opposite sides of a rotatable disc, a caliper straddling a portion of the circumference of the disc and incorporating therein an actuator for applying the friction pads against the disc, a stationary holder slidably mounting thereon the caliper, and a pad spring interposed between the caliper and the friction pads for biassing the friction pads in the radially inward direction with respect to the disc. The pad spring comprises two engaging portions which respectively extend in the direction of the axis of the disc for engaging with respective friction pads, and there are provided relief portions respectively between either one of the friction pads and either one of the engaging portions of the pad springs so that either one of the friction pads solely engaging with the other of the engaging portions.

4 Claims, 4 Drawing Figures

DISC BRAKE

BACKGROUND OF THE INVENTION

This invention relates to disc brakes the so-called floating caliper type.

Conventional floating caliper type disc brakes comprise a pair of friction pads disposed on opposite sides of a rotatable disc, a caliper straddling a portion of the circumference of the disc, an actuator such as a hydraulic cylinder piston device incorporated in the caliper and on one side of the disc for pressing one of the friction pad against the disc and displacing the caliper so that the other friction pad is pressed against the disc, and a stationary holder secured to a non-rotatable part of a vehicle and mounting the caliper thereon so as to move in the direction towards and away from the disc. The friction pads are usually supported by a pair of pins which are secured to the caliper, or otherwise, the friction pads are slidably supported on shoulders formed on the holder. However, there are problems in that vibrations of the friction pads have been experienced during running of the vehicle, thereby generating noisy sounds and injuring or wearing the friction pads and supporting portions.

For solving the problems aforementioned, there has been proposed a disc brake having a pad spring interposed between the caliper and the friction pads for pressing the friction pads generally in the direction radially inwards with respect to the disc. However, when the wear of the friction pads increases, the piston of the cylinder piston device projects out of the cylinder to compensate for the wear so that the friction pad on the side of the piston is displaced in the direction away from the cylinder, or in the direction approaching the other friction pad. When the friction pad on the side of the piston is displaced toward the other friction pad, the force of the pad spring acting on the other friction pad decreases as compared with the force acting on the friction pad on the piston side. Particularly, when the friction pad on the piston side approaches or passes over the central plane, which is defined between the friction pads when the friction pads are new, the force of the pad spring will be transmitted solely to the friction pad on the piston side, and the pad spring will sometimes be inclined and separate from the pad spring on the other side.

SUMMARY OF THE INVENTION

One of the objects of the present invention is to provide a disc brake eliminating the shortcomings aforementioned and, according to the invention, the pad spring is formed so as to have two engaging portions which respectively extend in the direction of the axis of the disc for respectively engaging with the friction pads, and there are provided relief portions respectively between each of the friction pads and the corresponding engaging portions of the pad spring so each of the friction pads engages solely with the engaging portion of the corresponding spring.

Preferably, the pad spring is formed of a single plate-like member having two engaging portions which are spaced in the direction of the circumference of the disc.

BRIEF DESCRIPTION OF THE DRAWINGS

The invention will hereinafter be explained in more detail with reference to the accompanying drawings illustrating some preferred embodiments of the invention, in which.

DETAILED DESCRIPTION OF THE PREFERRED EMBODIMENTS

Figure 1:
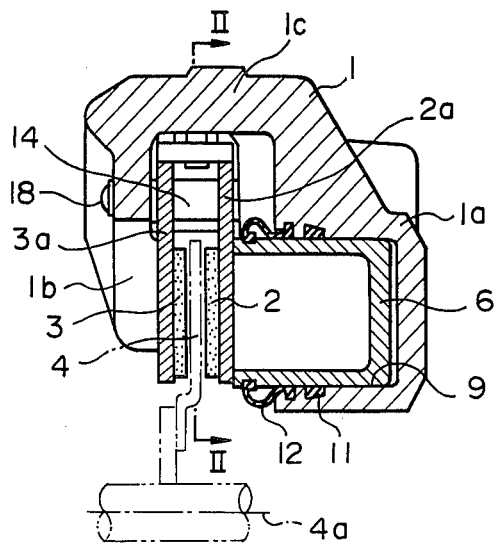
FIG. 1 is a sectional view of a disc brake according to the invention.
Figure 2:
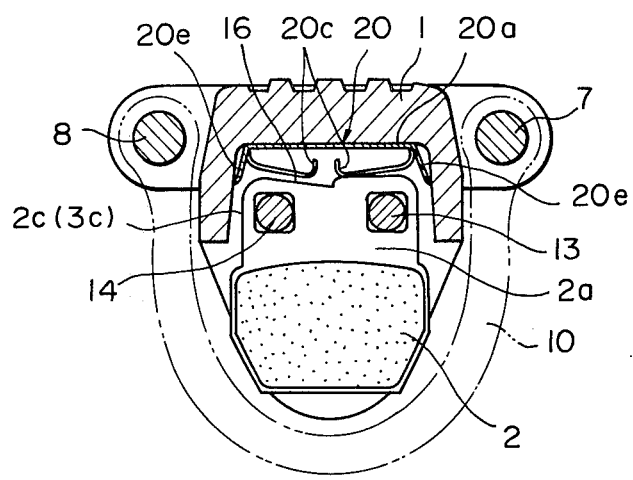
FIG. 2 is a sectional view taken along line II—II in FIG. 1.

The disc brake shown in FIGS. 1 and 2 comprises a pair of friction pad means constituted by friction pads 2 and 3 mounted on respective backing plates 2a and 3a disposed on opposite sides of a rotatable disc 4, a caliper 1 straddling a portion of the circumference of the disc 4, and a holder 10 adapted to be secured to a non-rotatable member such as a chasis of a vehicle. The caliper 1 comprises a limb portion 1a disposed on one side of the disc 4 and having a cylinder 9, another limb portion 1b disposed on the opposite side of the disc 4, and a bridge portion 1c disposed radially outwards of the disc 4 and connecting the limb portions 1a and 1b. A piston 6 slides in the cylinder 9 and engages with a backing plate 2a of the friction pad 2. The limb portion 1b engages with a backing plate 3a of the friction pad 3. A seal member 11 and a dust boot 12 are provided between the piston 6 and the cylinder 9.

The friction pads 2 and 3 are mounted on the caliper 1 on a pair of pins 13 and 14 which extend between the limb portions 1a and 1b. The pins 13 and 14 are retained on the caliper by a pair of retaining screws 18 (only one is shown in FIG. 1). For slidably mounting the caliper 1 on the holder 10, there is provided a pair of parallel and circumferentially spaced and axially extending pins 7 and 8. It will be noted that the term axially, circumferentially and radially are with reference to the disc 4. In the embodiment, one end of each of the respective pins 7 and 8 is secured to the holder 10, and the other ends of the pins 7 and 8 are received in respective bores (not shown) formed in the limb portion 1a of the caliper 1.

Figure 4:
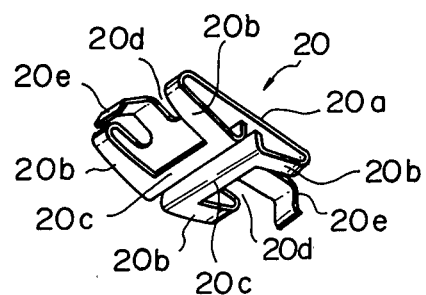
FIG. 4 is a perspective view of a pad spring.

A pad spring 20 is disposed between the bridge portion 1c of the caliper 1 and the backing plates 2a and 3a. As shown in FIG. 4, the pad spring 20 is a leaf spring formed of a single sheet of spring steel and comprises a base portion 20a with opposite end portions 20b of the base portion bent inwardly, and engaging portions 20c provided on the distal ends of the inwardly bent end portions 20b and extending in the direction of the axis 4a of the disc 4. The engaging portions 20c are spaced in the circumferential direction. There are formed cut-out portions 20d between respective engaging portions 20c and end portions 20b. Further, retaining portions 20e extend from the base portion 20a through respective cut-out portions 20d and in generally circumferential directions. The pad spring 20 is mounted between the radially inner surface of the bridge portion 1c of the caliper 1 and the backing plates 2a and 3a for the friction pads 2 and 3 with the base portion 20a and retaining portions 20e engaging the bridge portion 1c so as to locate the pad spring 20 with respect to the caliper 1.

According to the invention, one of the engaging portions 20c, the right hand one in FIG. 2, engages with backing plate 2a and the other of the engaging portions 20c engages with backing plate 3a. For the purpose of the present invention, spaces are provided between the one engaging portion 20c and the backing pad 3 and between the other engaging portion 20c and the backing plate 2a so as to prevent the engagement therebetween. In the embodiment of FIG. 2 the spaces are provided as a cut-out portion or a recess 16 formed in the upper edge of each of the backing plates 2a and 3a of the friction pads 2 and 3. The recess 16 is formed in the left side half of the upper edge of each of the friction pads as viewed from the side of the friction material. It will be noted that the configuration of two friction pads 2 and 3 and plates 2a and 3a is identical.

Therefore, respective engaging portions of the pad spring engage corresponding backing plates irrespective of the wear of the friction pads, and each friction pad receives a substantially constant spring force from the corresponding one of the engaging portions through the service life of the friction pad.

In the embodiment, the relief portions are formed in the backing plates; however, the spaces may be provided by an appropriate shape of the pad spring. For example, one of the engaging portions 20c can be formed to extend from one of the axial ends of the pad spring to the axially central position and the other of the engaging portion can be formed to extend from the central position to the other axial end. Alternatively, the engaging portion engaging with the backing plate 3a can be formed to have a short length in the axial direction since the backing plate 3a of the friction pad 3 is not displaced in the axial direction with respect to the caliper.

In the embodiment, the engaging portions 20c are formed on a single pad spring 20. However, the engaging portions 20c may be provided on two separate pad springs.

Figure 3:
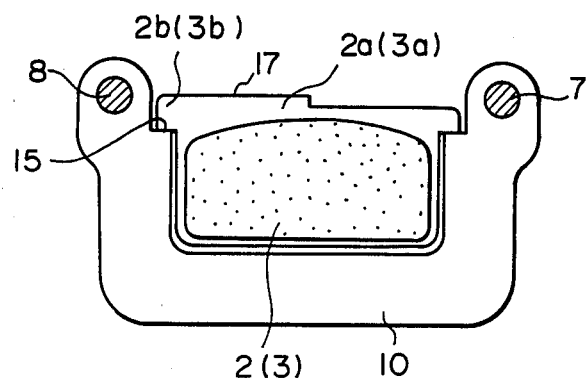
FIG. 3 is a schematic view showing another embodiment of the invention.

In the embodiment shown in FIG. 3, two friction pads 2 and 3 are mounted on backing plates 2a and 3a which are slidable on circumferentially spaced shoulders 15 formed on the holder 10. There are formed on the holder 10, two circumferentially spaced arm portions respectively straddling the circumference of the disc to define the shoulders 15. The pins 7 and 8 are secured to the caliper and received in bores formed in the holder. A projection 17 is formed on the upper edge of each of the backing plates of the friction pads so as to positively engage with the corresponding one of the engaging portions 20c of the pad spring.

According to the invention, it is possible to suppress vibrations of friction pads, and the force of the pad spring is evenly applied to the two friction pads irrespective of the wear of the friction pads.

What is claimed is:

1. A disc brake including a pair of friction pad means disposed on opposite sides of a rotatable disc, a caliper straddling a portion of the circumference of the disc and incorporating therein an actuator for applying the friction pad means against the disc, a stationary holder having said caliper slidably mounted thereon, and a pad spring interposed between the caliper and the friction pad means for biasing the friction pad means in the radially inward direction with respect to the disc, said pad spring comprising two engaging portions which respectively extend in the direction of the axis of the disc for engaging with respective friction pad means, said two engaging portions being deflectable independently of each other, and said engaging portions and said pad means having shapes for causing one of said engaging portions to engage only one of said pad means and the other of the engaging portions to engage only the other of said pad means.

2. A disc brake as set forth in claim 1 wherein said engaging portions extend in the direction of the axis of the disc a distance sufficient to lie above both said friction pad means, and cut-out portions are provided in the respective friction pad means opposite the engaging portions with which they are not engaged.

3. A disc brake as set forth in claim 1 wherein said engaging portions extend in the direction of the axis of the disc a distance sufficient to lie above both said friction pad means, and cut-out portions are provided in the respective engaging portions of the pad spring opposite the friction pad means with which they are not engaged.

4. A disc brake as set forth in claim 1 wherein said pad spring comprises a central portion engaging the caliper, and said two engaging portions extend from the central portion and are spaced from one another in the direction of the circumference of the disc.

* * * * *